United States Patent
Hashimoto et al.

[11] Patent Number: 6,138,811
[45] Date of Patent: Oct. 31, 2000

[54] SPLINE HUB AND METHOD OF MANUFACTURING THE SPLINE HUB

[75] Inventors: Hideki Hashimoto, Katano; Naohiko Takahashi, Ibaraki; Katsutoshi Seino, Shijonawate, all of Japan

[73] Assignee: Exedy Corporation, Osaka, Japan

[21] Appl. No.: 09/314,149

[22] Filed: May 19, 1999

[30] Foreign Application Priority Data

May 25, 1998 [JP] Japan .................................. 10-143202

[51] Int. Cl.$^7$ ..................................................... F16D 13/60

[52] U.S. Cl. ...................... 192/113.5; 192/200; 192/113.1

[58] Field of Search .............................. 192/113.5, 113.1, 192/200, 70.2; 403/359

[56] References Cited

U.S. PATENT DOCUMENTS

| | | | |
|---|---|---|---|
| 5,167,310 | 12/1992 | Fischer et al. | 192/70.16 |
| 5,384,949 | 1/1995 | Wodrich et al. | 29/557 |
| 5,590,752 | 1/1997 | Takehira et al. | 192/208 |
| 5,857,552 | 1/1999 | Hashimoto | 192/213.21 |

Primary Examiner—Rodney H. Bonck
Assistant Examiner—Tisha D. Waddell
Attorney, Agent, or Firm—Shinjyu Global IP Counselors, LLP

[57] ABSTRACT

A spline hub 6 is formed with a cylindrical boss (11) configured for engagement with a shaft extending from, for instance, a transmission. Axial spline grooves and circumferential grease grooves (14) are formed on the inner peripheral surface of the boss (11). A first axial end surface (14) of the grease groove (14) is tapered.

10 Claims, 6 Drawing Sheets

SPLINE HUB AND METHOD OF MANUFACTURING THE SPLINE HUB

BACKGROUND OF THE INVENTION

A. Field of the Invention

The invention relates to a spline hub and a method of manufacturing the same, and in particular the invention relates to a spline hub provided at an inner peripheral surface thereof with a circumferential lubricant-filled groove, i.e., a circumferential groove to be filled with lubricant.

B. Description of the Background Art

A clutch disk assembly used in an automobile is formed with a clutch plate and a retaining plate that together define input members, a spline hub disposed at a central portion of the plates, the spline hub defining an output member, and a damper mechanism between the plates and hub for dampening vibrations. The damper mechanism includes coil springs and other members arranged between the spline hub and the clutch and retaining plates. A clutch disk having at least one cushioning plate and friction facings is fixed to outer peripheral portions of the clutch and retaining plates.

The spline hub is formed with a cylindrical boss having a central bore. The central bore is provided with a plurality of spline grooves engageable with a shaft extending from a transmission. A flange extends radially outward from the boss. The flange is provided with windows or openings that accommodate coil springs. A clutch disk assembly of a separated hub type is also known. In this type, the flange is formed as a separate member from the boss and encircles the boss. The flange is coupled to the boss in a rotating direction via elastic members having a rigidity that is lower than the coil springs that couple the flange and the plates.

In the prior art, the spline hub is manufactured in a series of main steps, i.e., forging, turning, pressing, refining and broaching. In the forging step, a rod member is subjected to cutting, heating, shaping and trimming to prepare a basic form of the spline hub. In the turning step, turning is effected on the opposite side surfaces of the flange as well as the outer peripheral surface, end surfaces and inner peripheral surface of the boss. In the pressing step, apertures such as round apertures are formed by the press working, and distortion is removed in a restriking step. In the refining step, quenching and tempering are effected on the spline hub to provide a hardness of HRc 20–30. In an induction quenching step, induction heating is performed by induction coils arranged in the respective windows of the spline hub. Further, tempering at 180° C. is performed for two hours. In the final broaching step, the spline grooves are formed in the central bore of the spline hub by a broaching machine.

In the conventional spline hub described above, a plurality of grease grooves extend circumferentially along the inner peripheral surface of the central bore of the boss. These grease grooves are typically filled with grease. The grease reduces friction between the shaft of the transmission and the spline grooves of the spline hub when the spline hub slides axially on the shaft.

The end surfaces at the axially opposite ends of each grease groove are substantially perpendicular to the rotation axis of the hub. The grease grooves are formed before forming the spline grooves by the broaching. More specifically, the spline grooves are formed by moving a broach cutter through the central bore which is already provided with the grease grooves. Burrs are left around the grease grooves when forming the spline grooves by the broach cutter. Therefore, working is required for removing the burrs after the machining with the broach cutter. This increases the number of operation steps.

SUMMARY OF THE INVENTION

An object of the invention is to reduce steps required for removing burrs and other irregularities from within a spline hub having grease grooves formed therein.

In accordance with one aspect of the present invention, a spline hub includes a cylindrical boss having an inner peripheral surface configured for engagement with a shaft for rotation therewith. The inner peripheral surface of the boss is formed with a plurality of spline grooves that extend in an axial direction with respect to a rotational axis of the boss. The inner peripheral surface is further formed with at least one lubricant groove which extends circumferentially around the inner peripheral surface intersecting with each of the spline grooves. At least one of axial side of the lubricant groove includes a tapered surface that is inclined with respect to a line extending radially outward from and perpendicular to the rotational axis of the boss.

Preferably, the boss is provided with a plurality of the lubricant grooves, and each of the lubricant grooves is formed with at least one tapered surface on a corresponding axial side thereof.

Preferably, the lubricant groove is formed with a flat circumferentially extending surface and an intersection between the flat circumferentially extending surface and the tapered surface defines an angle between 25 and 35 degrees.

Preferably, a radially outer bottom surface of each of the spline grooves defines a first diameter within the boss, the flat circumferentially extending surface defines a second diameter within the boss, and the second diameter is larger that the first diameter.

Preferably, the angle is 30 degrees.

Alternatively, both axial sides of the lubricant groove include respective tapered surfaces that are inclined with respect to a line extending radially outward from and perpendicular to the rotational axis of the boss, the axial sides diverging away from one another toward the rotational axis.

In another aspect of the present invention, a method for manufacturing a spline hub includes the steps of:

forming a central bore in the boss;

forming a lubricant groove in the central bore which extends circumferentially around the inner periphery of the central bore, one of axial side of the lubricant groove having a tapered surface which extend radially inward and toward a first axial side of the boss; and forming spline grooves in the central bore by inserting a broach cutter into the central bore such that the broach cutter moves from the first axial side of the boss to a second axial side of the boss passing.

Preferably, the step of forming the spline grooves includes formation of a radially outer bottom surface of the spline grooves located radially inward from an outermost peripheral surface of the lubricant groove.

According to the method of manufacturing the spline hub, the spline grooves are formed so that occurrence of burrs can be suppressed.

DESCRIPTION OF THE PREFERRED EMBODIMENTS

Figure 1:
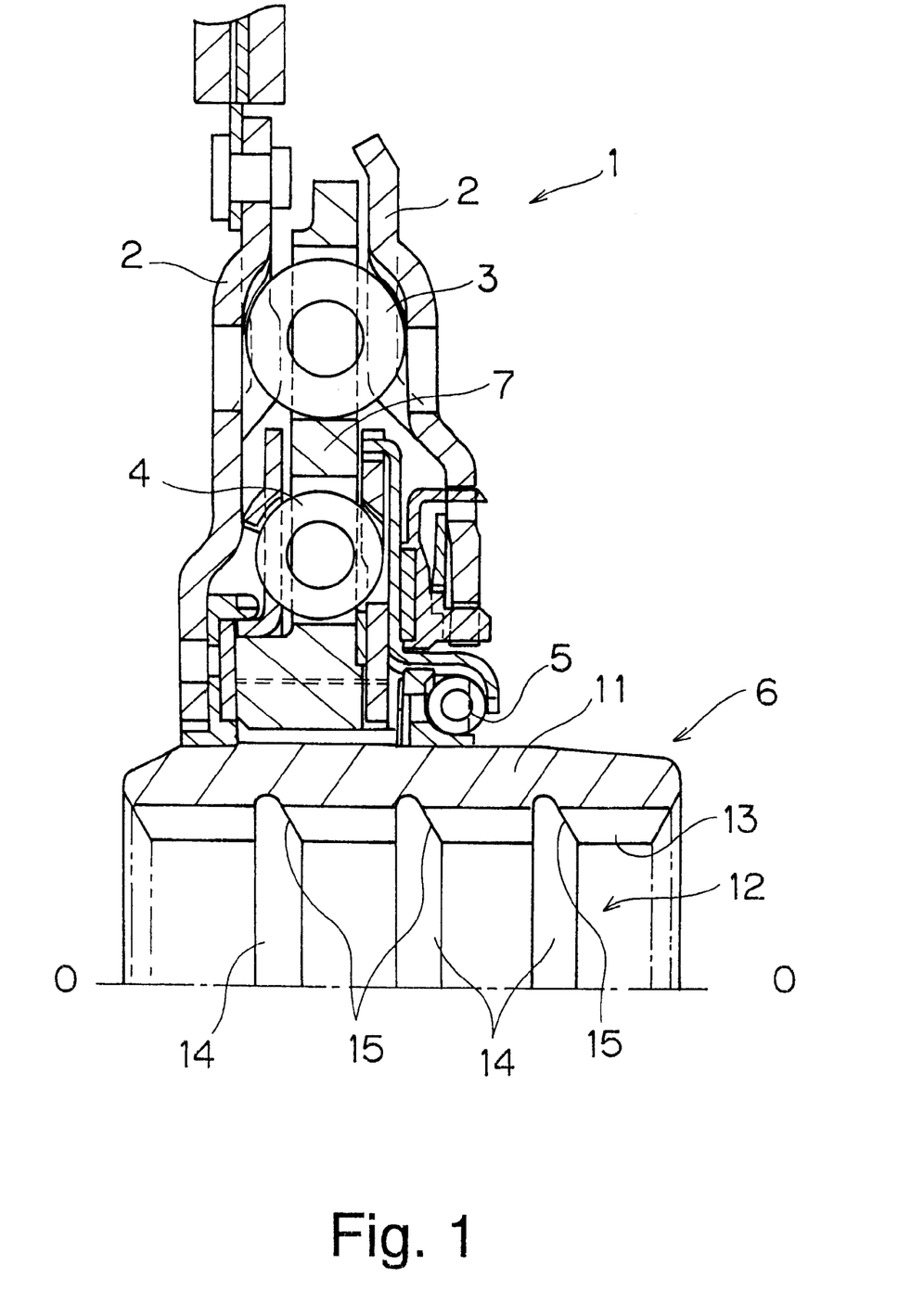
FIG. 1 is a fragmentary, schematic cross section of a clutch disk assembly having a spline hub in accordance with one embodiment of the present invention.

A clutch disk assembly 1 shown in FIG. 1 is basically formed with clutch and retaining plates 2 (input members), a spline hub 6 (an output member), and a damper mechanism that includes a plurality of elastic members 3, 4 and 5, arranged between the plates 2 and the spline hub 6. In the depicted embodiment, a hub flange 7 is arranged radially outside the spline hub 6. The hub flange 7 is elastically connected to the spline hub 6 in the rotating direction by the springs 4 and 5. It should be understood that the spline hub in accordance with the present invention may be used in any of a variety of clutch disk assembly configurations, and that the clutch disk assembly 1 described herein is only one example.

Figure 3:
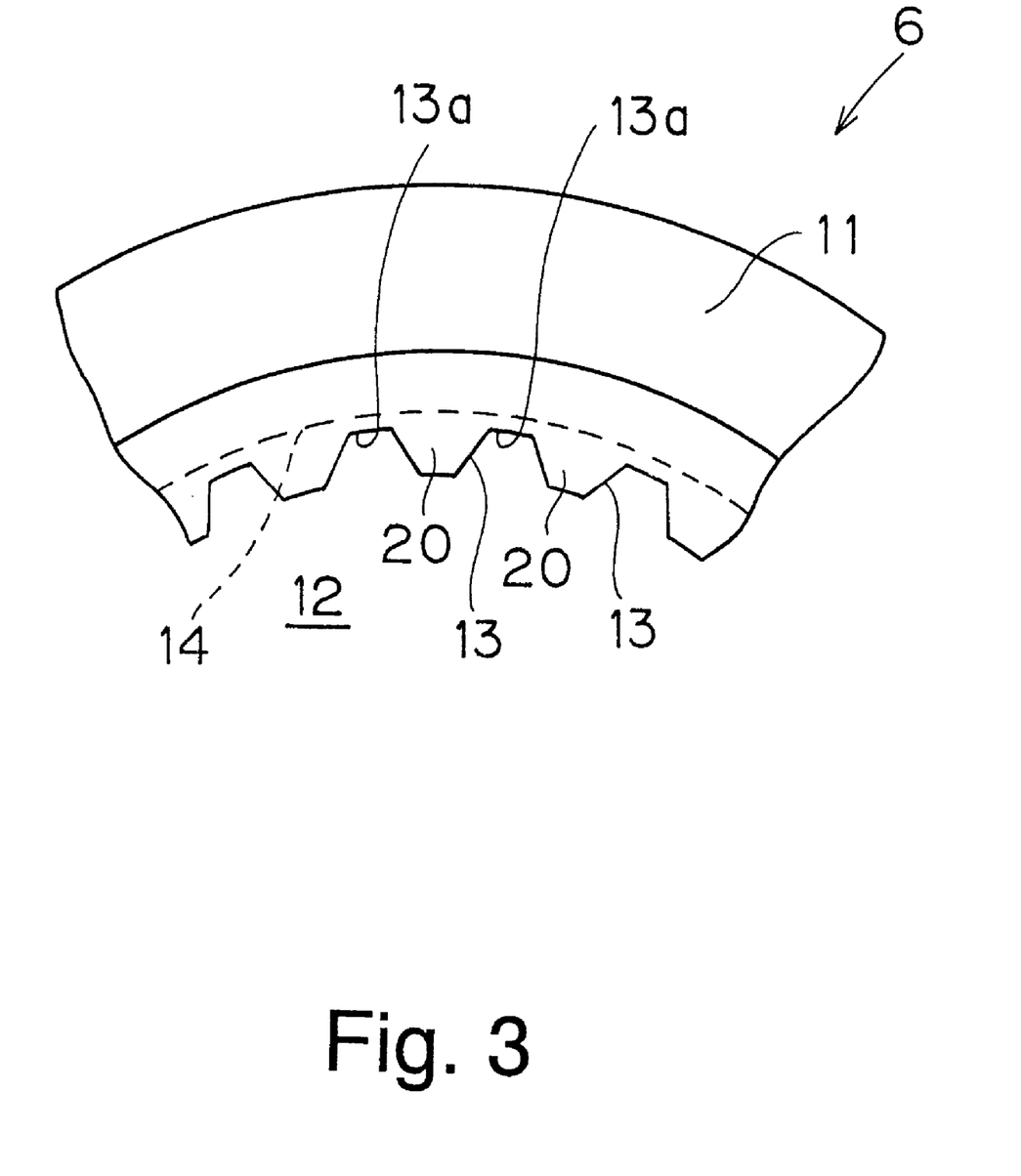
FIG. 3 is a fragmentary end view of the spline hub.

The spline hub 6 has an axially extending cylindrical boss 11 as shown in FIG. 1. A circular central bore 12 is formed in the center of the boss 11. A plurality of spline grooves 13 are formed in the central bore 12 as shown in FIG. 3. Each spline groove 13 is in the form of an elongated concavity which extends in an axial direction on the inner periphery of the boss 11. Gear teeth 20 are defined between each pair of adjacent spline grooves 13, the teeth 20 extending radially inward within the central bore 12. Each tooth 20 extends to the axially opposite ends of the boss 11. The opposing side surfaces of each tooth 20 converge in a radially inward direction. It should be understood, therefore, that adjacent side surfaces of adjacent teeth 20 within each individual spline groove 13 diverge away from one another.

A main drive shaft (not shown) extending from a transmission is insertable into the central bore 12. The spline grooves 13 of the boss 11 are engagable with corresponding spline projections (not shown) formed on the outer periphery of the transmission shaft so that the boss 11 of the spline hub 6 is non-rotatable but is axially movable with respect to the shaft.

Grease grooves 14 (i.e., lubricant-filled grooves, or grooves to be filled with lubricant) are formed on the inner peripheral surface of the central bore 12 of the boss 11. Each grease groove 14 extends circumferentially around the inner surface of the boss 11 thereby having an annular shape. The grease grooves 14 are filled with grease in order to supply the grease, i.e., lubricant to engaging surfaces of the spline grooves 13 and the spline projections (not shown) on the shaft. The lubricant reduces a sliding resistance between the boss 11 and the shaft. As a result, undesirable sticking or jamming between the shaft and boss 11 is suppressed.

Figure 2:
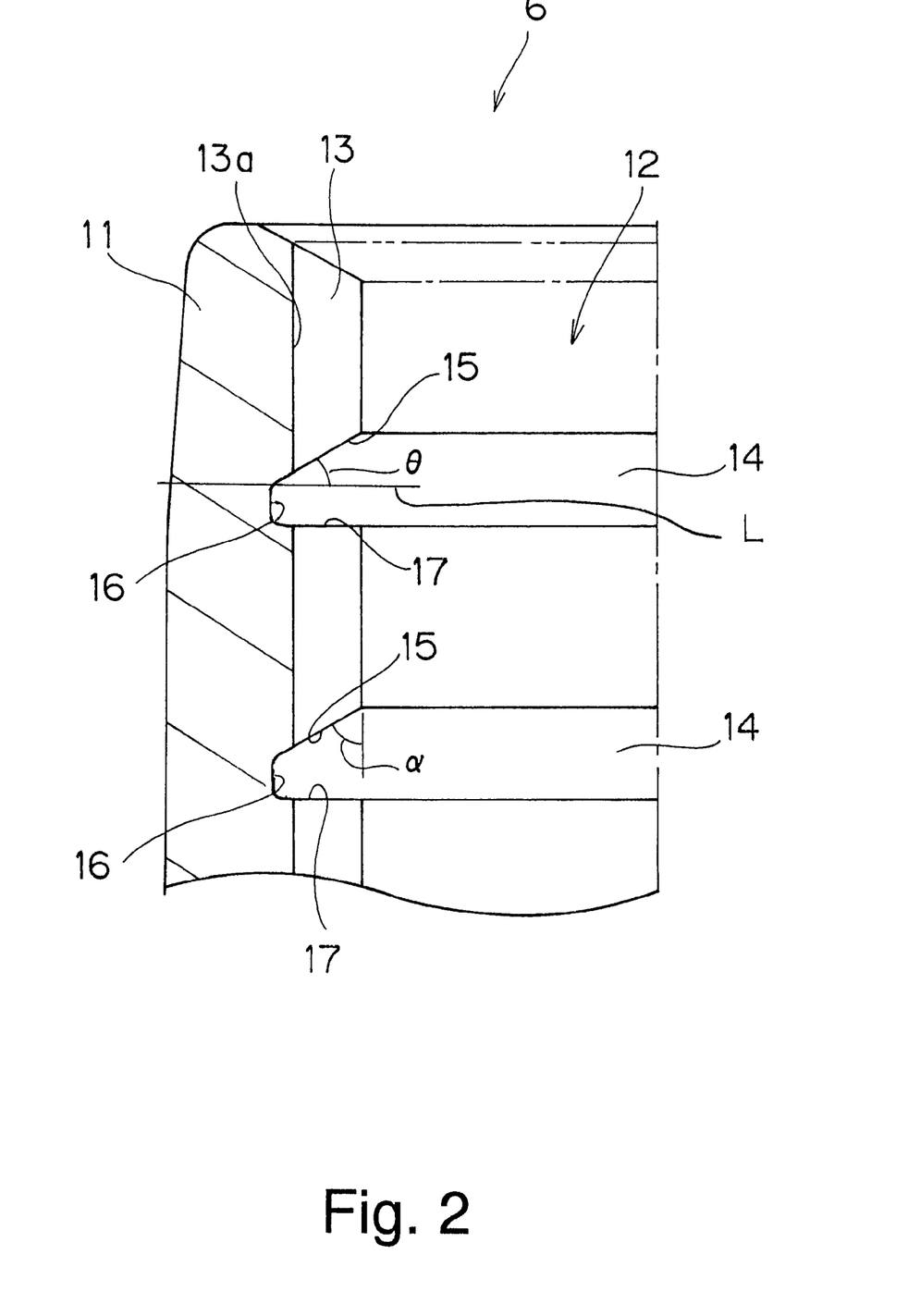
FIG. 2 is a fragmentary, cross section of the spline hub depicted in FIG. 1, on an enlarged scale.

The configuration of the grease grooves 14 is described below in greater detail with reference to FIGS. 2 and 3. The grease grooves 14 are formed in a plurality of (three in the embodiment depicted in FIG. 1) locations that are axially equally spaced from each other. Each grease groove 14 extends circumferentially intersecting the teeth 20 defined between the spline grooves 13. As shown in FIG. 2, each grease groove 14 has an outer peripheral surface 16 that is located radially outside bottom surfaces 13a of the spline grooves 13 (i.e., a diameter of the surface 16 is greater than a diameter defined by the surfaces 13a).

A first axial end surface 15 of the grease groove 14, i.e., an end surface located on a transmission side of the grease groove 14 is tapered. More specifically, the first axial end surface 15 has an annular shape that, when viewed from the side in a cross section view such as in FIG. 2, is inclined with respect to the center of the boss 11. In other words, the first axial end surface 15 has a conical shape that diverges toward a second axial end of the boss 11 (toward the transmission). The intersection between the surface 16 and the first axial end surface 15 defines an obtuse angle of about 120 degrees. Further, a line L extending radially outward from the center of the boss 11 passing through the surface 16 defines an angle θ of about 30 degrees with respect to the first axial end surface 15. The line L is perpendicular to the rotation axis of the spline hub 6. Conversely, the first axial end surface 15 forms an angle α of about 60 degrees with respect to a line parallel to the rotation axis of the spline hub 6. A sum of the angles α and θ is equal to 90 degrees.

A second axial end surface 17 of each grease groove 14, i.e., an end surface at the end near an engine side of the boss 11, is perpendicular to the rotation axis of the spline hub 6. The radially outermost portion of the grease groove 14 forms the outer peripheral surface 16 which extends substantially axially. Each outer peripheral surface 16 has axially opposite ends that intersect with the first and second axial end surfaces 15 and 17, respectively. The outer peripheral surface 16 is located radially outside the radially outer bottom surface 13a of each spline groove 13. In other words, the radially outer bottom surface 13a of the spline groove 13 is located radially inside the outermost periphery of the first axial end surface 15 of the tapered form.

Steps of manufacturing the spline hub 6 are described below. The manufacturing steps basically include the steps of: forging, turning, pressing, broaching, and carburizing quenching and tempering. Further, shot peening and corrosion protection may be performed after the carburizing quenching and tempering steps.

Figure 4:
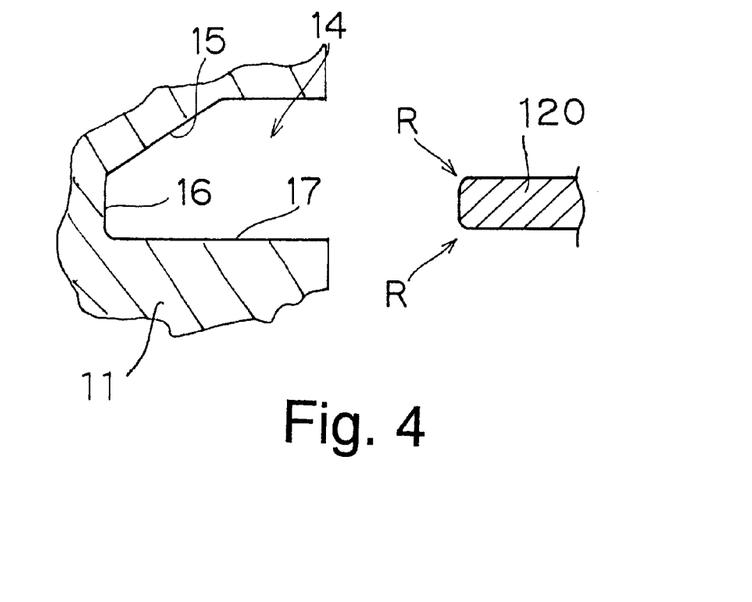
FIG. 4 is a fragmentary cross section of a portion of the spline hub showing a grease groove formed on an inner surface of the spline hub and showing a lathe cutting tool used to form the grease groove.

First, machine working for forming the grease grooves 14 is described below. The spline hub 6 is formed to include the boss 11, and the center of the boss 11 is provided with a plain bore, i.e., the central bore. As shown in FIG. 4, a cutting tool 120 is prepared. The cutting tool 120 includes corners having a radius R corresponding to the shape of the bottom corners of the grease groove 14 (i.e., a radius R is formed at the intersections between the outer peripheral surface 16 and the first and second axial end surfaces 15 and 17). The grease grooves 14 are formed by an NC lathe equipped with the cutting tool 120. More specifically, the cutting tool 120 is inserted into the bore of the boss 11 as the boss 11 is rotated, the cutting tool 120 is moved gradually radially outward until portions of the boss 11 are cut or chipped away by lathe action, and one of the grease grooves 14 is formed. Thereafter, the cutting tool 120 is moved radially inward and away from the inner surface of the boss 11. The above tool motion is continuously repeated to form the respective surfaces of the grease grooves 14.

Figure 5:
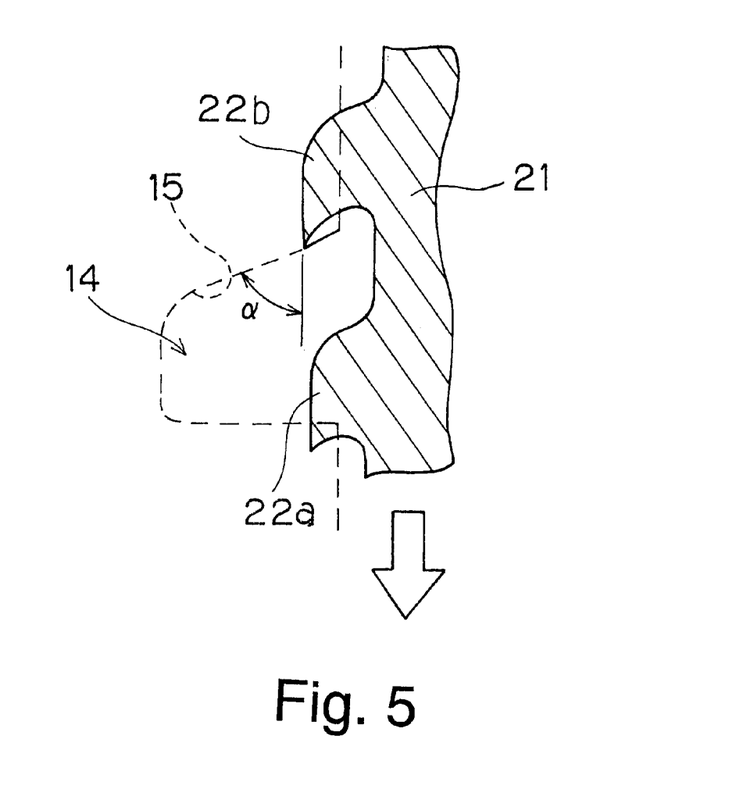
FIG. 5 is a schematic side view showing the grease groove of the hub (in phantom lines) and a broach cutter used to form spline grooves on the inner surface of the spline hub.

Description is now given on the step of forming the spline grooves 13 with a broach cutter 21. The broach cutter 21 is provided at its outer peripheral surface with a plurality of rows of blades, each row corresponding to one spline grooves 13 to be formed. Each row of blades is formed with a plurality of axially spaced blades, such as the blades 22a and 22b. It should be understood that there are more blades not shown. The two blades 22a and 22b are examples of the blades in each row of blades.

In each row of blades, each successive blade has a larger outer diameter than the neighboring blade located on the base end side. For instance, the blade 22a has a first diameter and the blade 22b has a slightly larger diameter. Each successive blade has a similarly increased diameter such that as the broach cutter 21 is forced through the boss 11, each blade 22a, 22b, etc. makes a slightly deeper cut into the inner surface of the boss 11 to form the spline grooves 13. Each blade 22a, 22b extends obliquely from the cutter body toward the tip end of the cutter 21, and has a substantially converging section, as shown in FIG. 5.

The broach cutter 21 is inserted into the central bore 12 of the boss 11 thereby moving the cutter 21 in an axial direction such that the cutter 21 first contacts each groove 14 from the side of the first axial end surface 15 and thereafter moves toward the second axial end surface 17 of the each groove 14 as the spline grooves 13 are formed. In this operation, the plain bore, i.e., the central bore is successively cut by the blades 22a, 22b etc., to increase an inner diameter at locations corresponding to the spline grooves 13. The radially outermost edge of each blade 22a, 22b, etc., is located radially inside the outer peripheral surface 16 and therefore the outermost periphery of the first axial end surface 15. Thus, the broach cutter 21 is always spaced apart from the portions of the spline hub 6 on which the outer peripheral surface 16 is formed. Further, the broach cutter 21 always moved into a groove 14 from the side of the tapered first axial end surfaces 15. In other words, the portion in the spline hub 6 that is cut by the blades 22a, 22b, etc., is tapered (i.e. on a portion of the tapered first axial end surface 15). Thereafter, the broach cutter 21 is pulled out of and away from the central bore 12 of the boss 11.

In the above operation, scrapings or chips of material removed from the boss 11 in the cutting process for forming the spline grooves 13 can be sharply and easily separated because the acute angle α is formed between the first axial end surface 15 and the blade 22 (in the rotation axis direction of the boss 11). As a result, the formation of burrs due to the broaching process can be suppressed.

Figure 6:
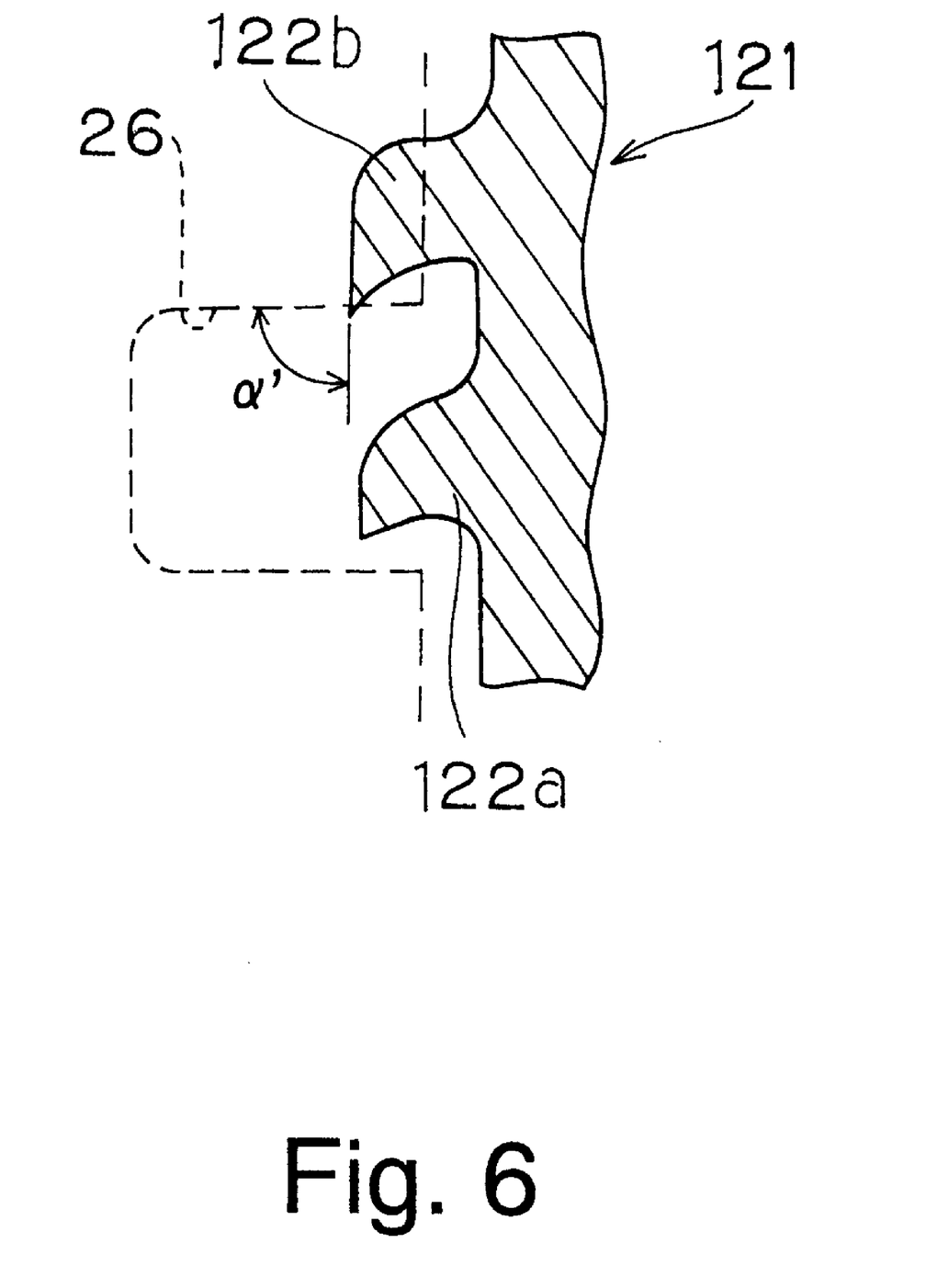
FIG. 6 is a schematic side view showing a prior art grease groove and a prior art broach cutter used to form spline grooves.

In a conventional grease groove shown in FIG. 6, the scrapings or chips removed from the spline grooves proximate the grease groove are not easily separated and remain partially attached to the boss. As a result, burrs are likely to form on the inner surface of the boss because an angle α' of 90 degrees is formed between a first axial end surface 26 and the blades 122a and 122b.

Referring again to the present invention depicted in FIG. 5, the taper angle α of the first axial end surface is preferably in a range from 25 to 35 degrees.

If the taper angle α is smaller than 25 degrees, scrapings or chips are likely to remain partially attached in the spline grooves proximate the grease groove after the broach has been forced through the boss 11, thus forming burrs. The scrapings or chips of material thus left behind are not easily removed.

As described above, since the grease groove 14 is provided with the first axial end surface 15 of the tapered form, occurrence of burrs can be suppressed in the broaching operation. Therefore, step(s) for removing the burrs can be eliminated, and the total number of manufacturing steps can be significantly reduced. Consequently, the number of the spline hubs which can be produced per a unit time can be significantly increased.

The tapered surface on the axial end of each grease groove can be formed on either the transmission side or the engine side. However, if the grease grooves are two or more in number, the tapered axial end surface of each groove must be formed on the same sides as the others. In any one of the above structures, the broach cutter is inserted into the central bore of the boss from the side provided with the tapered axial end surface toward the other side of the same groove, and then is returned toward the side provided with the tapered axial end surface.

Alternate Embodiment

Figure 7:
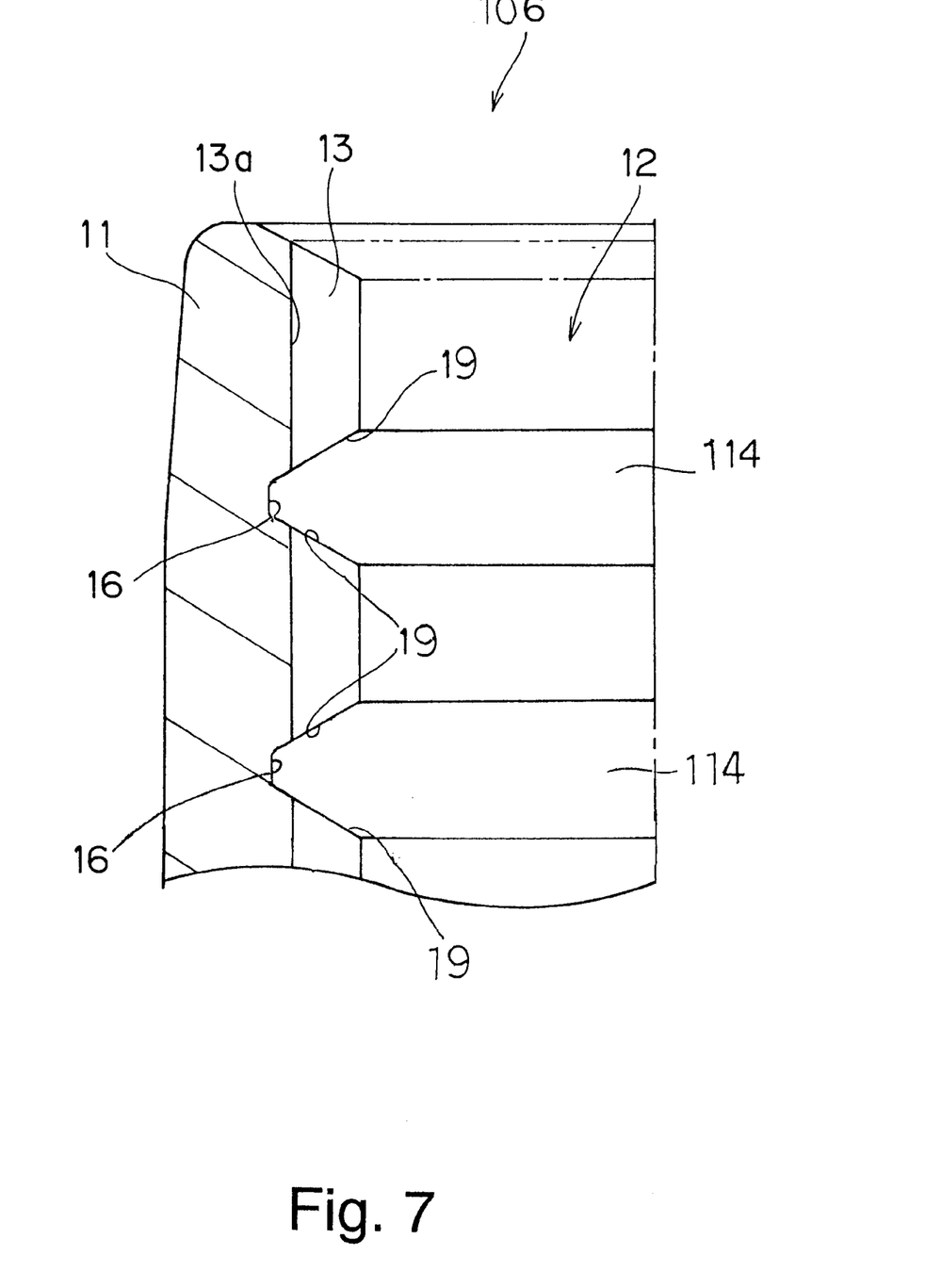
FIG. 7 is a fragmentary cross section side view similar to FIG. 2, showing a hub having a grease groove in accordance with another embodiment of the present invention.

In a spline hub 106 shown in FIG. 7, each grease groove 114 is provided at its axially opposite sides with tapered surfaces 19, respectively. Since all the grease grooves 114 are provided with the tapered surfaces on the axially opposite ends, this structure does not restrict the direction in which the broach cutter is to be inserted. According to the spline hub 106, the broach cutter can be inserted in either axial direction, and the tapered surfaces 19 on the upstream sides in the cutter inserting direction can achieve the intended effect, i.e. reduce the likelihood of formation of burrs.

The spline grooves 13 and the grease grooves 114 in this embodiment are formed in the manner similar to that of the foregoing embodiment. Specifically, the grease grooves 114 are formed using a cutting tool on a lathe and the spline grooves 13 are formed with a broach cutter.

According to the spline hub of the invention, since the tapered surface is formed on at least one of the axial ends of the lubricant-filled groove, occurrence of burrs can be suppressed by inserting the broach cutter from the side provided with the tapered surface when forming the spline grooves so that the chips and scrapings are easily cut away or separated from the boss.

What is claimed is:

1. A spline hub comprising:
   a cylindrical boss having an inner peripheral surface configured for engagement with a shaft for rotation therewith, said inner peripheral surface being formed with a plurality of spline grooves and spline teeth that extend in an axial direction with respect to a rotational axis of said boss, and said inner peripheral surface being further formed with at least one lubricant groove which extends circumferentially around said inner peripheral surface intersecting with each of said spline grooves; and
   wherein at least one of axial side of said lubricant groove includes a tapered surface that is inclined with respect to a line extending radially outward from and perpendicular to the rotational axis of said boss, said tapered surface extending radially outward with respect to the rotational axis from an innermost surface of said spline teeth, and approaching the other axial side as said tapered surface extends radially outward.

2. The spline hub according to claim 1, wherein said boss is provided with a plurality of said lubricant grooves, and each of said lubricant grooves is formed with at least one of said tapered surface on a corresponding axial side thereof.

3. The spline hub according to claim 1, wherein said lubricant groove is formed with a flat circumferentially extending surface and an intersection between said flat circumferentially extending surface and said tapered surface defines an angle between 25 and 35 degrees.

4. The spline hub according to claim 3, wherein a radially outer bottom surface of each of said spline grooves defines a first diameter within said boss, said flat circumferentially extending surface defines a second diameter within said boss, said second diameter being larger that said first diameter.

5. The spline hub according to claim 3, wherein said angle is 30 degrees.

6. A spline hub comprising:

a cylindrical boss having an inner peripheral surface configured for engagement with a shaft for rotation therewith about a rotational axis of said boss, said inner peripheral surface being formed with a plurality of spline grooves and spline teeth that extend in an axial direction with respect to the rotational axis of said boss, and said inner peripheral surface being further formed with at least one lubricant groove which extends circumferentially around said inner peripheral surface intersecting with each of said spline grooves; and wherein both axial sides of said lubricant groove include respective tapered surfaces that are inclined with respect to a line extending radially outward from and perpendicular to the rotational axis of said boss, said axial sides diverging away from one another toward said rotational axis, said tapered surfaces extending radially outward with respect to the rotational axis from an innermost surface of said spline teeth.

7. The spline hub according to claim 6, wherein said boss is provided with a plurality of said lubricant grooves, and both of axial sides of said plurality of lubricant grooves are formed with tapered surfaces.

8. The spline hub according to claim 6, wherein said lubricant groove is formed with a flat circumferentially extending surface and an intersection between said flat circumferentially extending surface and said tapered surface defines an angle between 25 and 35 degrees.

9. The spline hub according to claim 8, wherein a radially outer bottom surface of each of said spline grooves defines a first diameter within said boss, said flat circumferentially extending surface defines a second diameter within said boss, said second diameter being larger that said first diameter.

10. The spline hub according to claim 8, wherein said angle is 30 degrees.

* * * * *